(12) United States Patent
Rezaee

(10) Patent No.: US 10,581,310 B2
(45) Date of Patent: Mar. 3, 2020

(54) ELECTROMECHANICAL CONVERTER FOR AUTOMATICALLY CHANGING AND ADJUSTING DRIVING TORQUE IN A VEHICLE

(71) Applicant: Meghdad Rezaee, Tehran (IR)

(72) Inventor: Meghdad Rezaee, Tehran (IR)

( * ) Notice: Subject to any disclaimer, the term of this patent is extended or adjusted under 35 U.S.C. 154(b) by 301 days.

(21) Appl. No.: 15/684,771

(22) Filed: Aug. 23, 2017

(65) Prior Publication Data

US 2018/0069465 A1   Mar. 8, 2018

(51) Int. Cl.

| | |
|---|---|
| *H02K 3/16* | (2006.01) |
| *H02K 7/00* | (2006.01) |
| *H02K 26/00* | (2006.01) |
| *H02P 25/18* | (2006.01) |
| *H02K 51/00* | (2006.01) |
| *H02K 1/24* | (2006.01) |
| *H02K 3/42* | (2006.01) |
| *H02K 11/04* | (2016.01) |
| *H02K 11/21* | (2016.01) |

(Continued)

(52) U.S. Cl.
CPC .............. *H02K 51/00* (2013.01); *H02K 1/24* (2013.01); *H02K 3/02* (2013.01); *H02K 3/16* (2013.01); *H02K 3/42* (2013.01); *H02K 7/006* (2013.01); *H02K 11/04* (2013.01); *H02K 11/21* (2016.01); *H02K 13/10* (2013.01); *H02K 26/00* (2013.01); *H02P 1/00* (2013.01); *H02P 25/18* (2013.01); *H02P 3/14* (2013.01); *H02P 2101/45* (2015.01)

(58) Field of Classification Search
CPC ............ H02K 1/223; H02K 1/24; H02K 1/26; H02K 1/265; H02K 3/02; H02K 3/12; H02K 3/16; H02K 3/18; H02K 3/20; H02K 3/30; H02K 3/32; H02K 3/42; H02K 3/46; H02K 3/47; H02K 3/50; H02K 3/52; H02K 7/006; H02K 11/04; H02K 11/21; H02K 11/215; H02K 11/22; H02K 11/225; H02K 11/23; H02K 11/30; H02K 11/33; H02K 13/10; H02K 21/042; H02K 21/10; H02K 26/00; H02K 51/00; H02P 1/00; H02P 3/14; H02P 25/18; H02P 2101/45
USPC ..... 310/68 B, 179, 180, 184, 195, 198, 199, 310/208, 210
See application file for complete search history.

(56) References Cited

U.S. PATENT DOCUMENTS 3,688,172 A * 8/1972 Sieber ................. H02P 6/14
                                                       318/400.26
4,055,789 A * 10/1977 Lasater .................. H02J 7/14
                                                       320/124

(Continued)

*Primary Examiner* — Nguyen Tran
*Assistant Examiner* — David A. Singh

(57) ABSTRACT

An electromechanical converter for automatically adjusting driving torque from an engine of a vehicle comprises a rotor, a stator, and a set of windings. The set of windings comprises main windings, subsidiary windings, and auxiliary windings. The rotor is housed within a stator, comprises a pole. A hub of the stator shaft is engaged to auxiliary stator and transfers energy from the engine to output. Each coil of the main and subsidiary windings is wound on each pole. Each coil of the auxiliary windings is wound between poles. The stator is separated from the rotor by gap. An output shaft is connected to auxiliary stator and it is engaged to the stator shaft. The comparative rotating of the rotor and stator creates current at the windings of the rotor and the stator.

18 Claims, 18 Drawing Sheets

(51) Int. Cl.
   *H02K 13/10* (2006.01)
   *H02K 3/02* (2006.01)
   *H02P 1/00* (2006.01)
   *H02P 101/45* (2016.01)
   *H02P 3/14* (2006.01)

(56) References Cited

U.S. PATENT DOCUMENTS

| | | | | |
|---|---|---|---|---|
| 4,160,938 A * | 7/1979 | Akamatsu | ............... | H02P 27/06 318/722 |
| 4,740,734 A * | 4/1988 | Takeuchi | .................. | H02P 6/28 318/400.26 |
| 6,175,178 B1 * | 1/2001 | Tupper | .................. | H02K 7/025 310/114 |
| 2001/0045095 A1 * | 11/2001 | Kim | ........................ | H02P 1/163 62/51.1 |
| 2004/0108789 A1 * | 6/2004 | Marshall | .................. | H02K 1/24 310/216.016 |
| 2008/0105078 A1 * | 5/2008 | Gregor | ....................... | F01L 1/34 74/568 R |
| 2008/0211338 A1 * | 9/2008 | Koka | ..................... | H02K 21/22 310/198 |
| 2009/0102314 A1 * | 4/2009 | Miyata | ................... | H02K 1/145 310/257 |
| 2010/0060097 A1 * | 3/2010 | Peterson | ................ | H02K 53/00 310/179 |
| 2011/0050025 A1 * | 3/2011 | Doushita | ................ | H02K 1/146 310/198 |
| 2012/0007532 A1 * | 1/2012 | Baglino | ................ | B60L 15/025 318/473 |
| 2012/0313492 A1 * | 12/2012 | Yamada | ................... | H02K 1/24 310/68 D |
| 2013/0134823 A1 * | 5/2013 | Yamada | ................... | H02K 1/24 310/216.004 |
| 2013/0221789 A1 * | 8/2013 | Atkinson | ................ | H02K 1/276 310/156.67 |
| 2014/0292134 A1 * | 10/2014 | Tsuda | ..................... | H02K 19/20 310/185 |
| 2014/0346916 A1 * | 11/2014 | Sakon | .................... | H02K 13/04 310/208 |
| 2015/0171674 A1 * | 6/2015 | Lee | ........................ | H02K 1/246 318/724 |
| 2016/0036308 A1 * | 2/2016 | Bailey | .................. | H02K 21/024 290/45 |
| 2016/0233729 A1 * | 8/2016 | Lambert | ................ | H02K 1/146 |
| 2017/0335848 A1 * | 11/2017 | Morozumi | .......... | F04C 29/0057 |
| 2018/0205279 A1 * | 7/2018 | Linares | .................... | H02K 3/28 |

* cited by examiner

ELECTROMECHANICAL CONVERTER FOR AUTOMATICALLY CHANGING AND ADJUSTING DRIVING TORQUE IN A VEHICLE

BACKGROUND OF THE INVENTION

Power transmission, in vehicles refers to the mechanism or components involved that transfer power from a power source to the point of application of power. Gearboxes comprising gears and gear trains are currently the most popular device for power transmission in automobiles. Gearboxes have gears that are of different shapes and sizes and are connected with each other in different ways to create different speeds and torques.

Traditionally, gearboxes are categorized as either a manual or an automatic type. Although, automatic gearboxes have changed modes of switching gears from manual to automatic mode using sensors and electronic drivers, power transmission and changing of torque and speed is still mostly mechanically performed, involving gear shifting. In vehicles having a manual gearbox, gear shifting is different for different users. For example, experienced drivers and relatively new drivers may have completely different timings for gear shifting. Incorrect gear shifting or engaging of the clutch will lead to increased fuel consumption and environment pollution in addition to wear and tear of clutch and other moving sections of automobiles. An apparatus or a device, which varies torque and speed optimally based on varying load requirements thereby decreasing fuel consumption and wear and tear, is required.

Moreover, in conventional automatic gearboxes, changes in values of output torque are as stepped output and discontinuous. Existing intelligent systems only manage how and when to change gears. When resisting torque is continuously changed in a system such as a vehicle, driving torque should be continuously changed to reach an optimized mode. In practice, since (torque*Speed-RPM) curves are non-linear and value curves of resistant torque and driving torque in conventional automatic gearboxes are mismatched, their performance is not ideal and wastes significant percentage of the engine output mechanical energy. An apparatus or device, which adjusts driving torque and vehicle speed automatically based on the resistant torque (assuming constant engine power), is required.

Hence, there is a long felt but unresolved need for an apparatus or a device, which varies torque and speed optimally based on varying load requirements thereby decreasing fuel consumption and wear and tear. Furthermore, there is a need for an apparatus or device, which adjusts driving torque and vehicle speed automatically based on the resistant torque (assuming constant engine power).

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The electromechanical converter, disclosed herein, addresses the above-mentioned need for an apparatus or a device, which varies torque and speed optimally based on varying load requirements thereby decreasing fuel consumption and wear and tear. Furthermore, the electromechanical converter addresses the need for an apparatus or device, which adjusts driving torque and vehicle speed automatically based on the resistant torque (assuming constant engine power). The electromechanical converter for automatically changing and adjusting driving torque from an engine of a vehicle comprises a set of windings, a rotor, a stator, several diodes, one or more relays, two insulated-gate bipolar transmission (IGBT) (or other similar switch), electronics control circuit, a capacitor, and two batteries. The two batteries include, for example, vehicle main battery and auxiliary battery. The set of windings comprise first main winding, first subsidiary winding, second main winding, second subsidiary winding, first auxiliary winding, and second auxiliary winding. Each winding contains several coils. The rotor is housed within a stator and comprises one or more poles. The rotor is configured to be connected to an input shaft from the engine. Each coil of the first main windings and the first subsidiary windings are wound on each pole of the rotor. The stator is coaxially positioned with the rotor. Moreover, the stator is separated from the rotor by a gap. An output shaft is engaged to the stator shaft.

Each coil of the second main winding and the second subsidiary winding is wound on each pole of the stator. The batteries are configured to be charged and power the set of windings of the rotor and the stator only at required times. One of the main windings and subsidiary windings of each of the rotor and the stator are selectively switched-on to proper functioning of the electromechanical converter.

One aspect of the present invention is directed to an electromechanical converter for automatically changing and adjusting driving torque from an engine of a vehicle. This electromechanical converter comprises (a) a set of windings comprising first main winding, first subsidiary winding, second main winding, second subsidiary winding, first auxiliary winding, and second auxiliary winding; (b) a rotor housed within a stator, the rotor comprising one or more poles, wherein one end of the rotor body is connected to an input shaft from the engine, wherein each coil of the first main winding and the first subsidiary winding are wound on each pole of the rotor; (c) the stator coaxially positioned with the rotor and the stator separated from the rotor by a gap, wherein one end of the stator body is connected to a shaft wherein a hub of this shaft is configured to be engaged to a cylindrical shell called auxiliary stator and an output shaft is connected to the auxiliary stator, wherein each coil of the second main winding and the second subsidiary winding is wound on each pole of the stator; (d) two batteries include vehicle main battery and auxiliary battery wherein are configured to be charged and power the set of windings of the rotor and the stator only at required times, wherein one of the main windings and subsidiary windings of each of the rotor and the stator are selectively switched-on to proper functioning of the electromechanical converter; (e) several diodes, one or more relays, two insulated-gate bipolar transmission IGBT (or other similar switch), electronics control circuit, and a capacitor.

In case of main windings, one side of each pole coil is placed on the pole of the rotor or stator at the far left of above pole, and then goes to the far opposite side of the pole obliquely in-depth of the space between the poles (or more away from the surface of the pole) and goes along the pole through the space and closed to pole wall symmetrically and completes the conductor loop around the pole. In case of subsidiary windings, the windings are done symmetrically exactly. This method of wire furling called the first method.) In a related embodiment, both sides of each coil of the main windings and the coil of the subsidiary windings are wound obliquely around a surface of each pole of the stator and the rotor. One side is near to and another side is away from the air gap and surface include their ring angle, angles to pole over surface and this angle is symmetry for main and subsidiary windings.

In one embodiment, the electromechanical converter further comprises a second method of winding, wherein two sides of each coil are on the surface of respective pole and the coils of main and subsidiary are similar and coinciding. In a related embodiment, each coil of main or subsidiary windings of rotor or stator is located on the surface and around of respective pole and near to air gap.

In a related embodiment, each coil of the main or subsidiary windings of rotor or stator is wound around the surface of each pole of the stator or the rotor. In one embodiment, the rotor and stator are made of thin sheets of iron wherein each sheet is coated with an insulator to minimize eddy currents. In another embodiment, the electromechanical converter further comprises at least two spring elements positioned at a spacing between a projection of stator shaft and groove of auxiliary stator to decrease fluctuations in torque output and shocks due to varying air gaps and applied torque between the rotor and stator. In one embodiment, an auxiliary winding includes some coils without poles is placed between the poles of the rotor and it repeats about the stator to improve generate voltage and a gradual increase in current. The auxiliary windings include three shapes, herein referred to as, Shape 1, Shape 2, and Shape 3.

Shape 1 includes coils having each side placed between the adjacent poles and along the poles and close to hypothetical cylindrical surface includes air gaps between the rotor and the stator. The distance between two sides of each coil is about three-quarters of the average width of two side poles. The coils may exist between any two adjacent poles (of the rotor or stator) or does not exist. The rotor coils are in series together, create one or more windings and the stator coils series together, and create another one or more windings. Shape 2 includes coils placed near each pole (in the rotor or stator) along the pole and close to hypothetical cylindrical surface include air gaps between the rotor and the stator (a coil at one side of the pole and another coil at the other side of the pole).

Further, both sides of each coil is placed near each other and this is repeated for all or some of the poles. The rotor coils in series (or parallel) create one or more windings and so the stator coils in series (or parallel) create another one or more windings. Shape 3 includes coils in which the two sides of each coil are located adjacent to each other and the coils are located between all or some of the adjacent poles and close to the hypothetical cylindrical surface of the air gaps. In another embodiment, each one of the rotor and stator is placed on two or more separate bearings, and each of the bearings of the rotor and stator are connected to converter chassis. Of course, rotor and stator may be connected together by one or more separate bearings.

In one embodiment, the electromechanical converter further comprises diodes connected in series with the first main winding, the first subsidiary winding, the first auxiliary winding, the second main winding, the second subsidiary winding, and the second auxiliary winding, separately. The diodes generate direct currents through the windings. In another embodiment, the electromechanical converter further comprises a direction-finding sensor positioned proximal to and in communication with the stator and rotor, wherein the direction-finding sensor is configured to detect the direction of comparative rotation of the rotor and stator. In one embodiment, the electromechanical converter further comprises a set of relays in series with the main windings and the subsidiary windings and auxiliary windings of the rotor and stator, wherein the relays are configured to selectively connect and disconnect the main windings and the subsidiary windings to power supplies or capacitor or together. In one embodiment, the windings are made of one of copper or silver or gold to minimize the resistance and resultant heat generated.

In one embodiment of the electromechanical converter, an external button is in communication with the relays, wherein the external button connects the main windings or the subsidiary windings to the battery(s) for increasing the torque and acceleration generated between the stator and the rotor. In another embodiment, when the rotor rotates clockwise and faster than the stator, or anti-clockwise and slower than the stator, the main windings of the rotor and the stator are connected, and the subsidiary windings of the rotor and the stator are disconnected. When the rotor rotates faster than the stator in a forward or backward movement causing a positive acceleration of the engine at the output. In one embodiment, when the rotor rotates clockwise and slower than the stator or anti-clockwise and faster than the stator, the main windings of the rotor and the stator are disconnected, wherein the subsidiary windings are connected. When the rotor rotates slower than the stator for the forward or backward movement of the vehicle causing a negative acceleration of the engine at the output. Additionally, the auxiliary windings of the rotor and the stator are connected in multiple ways. In a related embodiment, the negative acceleration of the engine is one of a fast braking mode and a soft braking mode.

One aspect of the present invention is directed to an electromechanical converter for automatically changing and adjusting driving torque from an engine of a vehicle, comprising: (a) a set of windings comprising first main windings, first subsidiary windings, first auxiliary windings, second main windings, second subsidiary windings, and second auxiliary windings; (b) a rotor housed within a stator, the rotor comprising one or more poles, wherein the first main windings and the first subsidiary windings are wound on each pole of the rotor, and wherein the first auxiliary windings are positioned between the poles; (c) the stator coaxially positioned with the rotor and the stator separated from the rotor by a gap, wherein the second main windings and the second subsidiary windings are wound on each pole of the stator; and wherein the second auxiliary windings are positioned between the poles; and (d) at least two batteries configured to power or absorb power from the set of windings of the rotor and the stator, wherein one of the main windings and subsidiary windings of each of the rotor and the stator are selectively switched-on to appropriate operation.

In one embodiment, the electromechanical converter further comprises a first method of winding, wherein a first end of each coil of main winding and subsidiary winding is positioned distally towards a wall of the poles of one of the rotor and the stator and proximity to air gap, and a second end of each coil of main winding and subsidiary winding is distally exposed towards other side wall of the poles of one of the rotor and the stator and distant from the air gap. In a related embodiment, each coil of the main windings and the subsidiary windings are wound obliquely around a surface of each pole of the stator and the rotor. In one embodiment, the electromechanical converter further comprises a second method of winding, wherein a first end of each main winding and subsidiary winding is positioned distally towards the right wall of the poles of one of the rotor and the stator, and a second end of each main winding and subsidiary winding is distally exposed towards the left wall of the poles of one of the rotor and the stator. In a related embodiment, both sides of each coil of the main windings and the subsidiary windings are wound around a surface of each pole of the stator and the rotor. In a related embodiment, both sides of each coil of the main windings and the subsidiary windings are wound around a surface of each pole of the stator and the rotor and proximity to the air gap. In one embodiment, the rotor and stator are coated with an insulator to minimize eddy currents.

In one embodiment of the electromechanical converter, an output shaft is connected to auxiliary stator and the auxiliary stator is engaged to the hub of the stator shaft, further comprising at least two spring elements positioned at a spacing between a stator shaft projection and auxiliary stator groove to decrease fluctuations in torque output and shocks due to varying air gaps between the rotor and the stator. In one embodiment, an auxiliary coil without pole is placed between the poles of the rotor and the stator to generate voltage and a gradual increase in current. In one embodiment, the rotor and stator are placed on separate bearings, and each of the bearings of the rotor and stator connect the stator and the rotor, the stator and a chassis of the electromechanical converter, or the rotor and the chassis of the electromechanical converter.

In one embodiment, the electromechanical converter further comprises one or more diodes connected in series with each of the auxiliary windings, the main windings and the subsidiary windings of the rotor and the stator, wherein the diode generates a direct current flow through the windings. In one embodiment, the electromechanical converter further comprises a direction-finding sensor positioned proximal to and in communication with the stator and rotor, wherein the direction-finding sensor is configured to detect the direction of comparative rotation of the rotor and stator. In a related embodiment, the direction-finding sensor comprises a brush fixedly attached along a circumference of a rotor shaft, wherein the brush is configured as a flexible strip with varying width to contact a papilla connected to the stator body via linear springs, wherein a movement of the brush strikes the papilla into each side micro switch located at constant ends of the linear springs to target sectors of the circuit.

In one embodiment, the electromechanical converter further comprises a set of relays in series with the auxiliary windings, the main windings and the subsidiary windings of the rotor and stator, wherein the relays are configured to selectively connect and disconnect each of the auxiliary windings, the main windings and the subsidiary windings to circuit, separately. In another embodiment, the windings are made of one of silver, copper, gold or its combination thereof, to minimize the resistance and resultant heat generated. In one embodiment, an external button is in communication with the relays, wherein the external button connects both the main windings or the subsidiary windings to the battery for increasing the torque and acceleration generated relatively between the stator and the rotor.

In one embodiment of the electromechanical converter, the main windings of the rotor and the stator are connected, wherein the subsidiary windings are disconnected while the rotor rotates faster than the stator in a forward movement, causing a positive acceleration of the engine, or rotor rotates slower than the stator in a backward movement causing a negative acceleration of the engine. In one embodiment, the main windings of the rotor and the stator are disconnected, wherein the subsidiary windings are connected while the rotor rotates slower than the stator for the forward movement of the vehicle with negative acceleration of the engine, or rotor rotates faster than the stator in a backward movement causing a positive acceleration of the engine.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION

The present invention generally relates to electrical transmission devices. More particularly, the invention relates to an electromechanical transmission device for automatically changing and adjusting driving torque from an engine of a vehicle.

Figure 1:
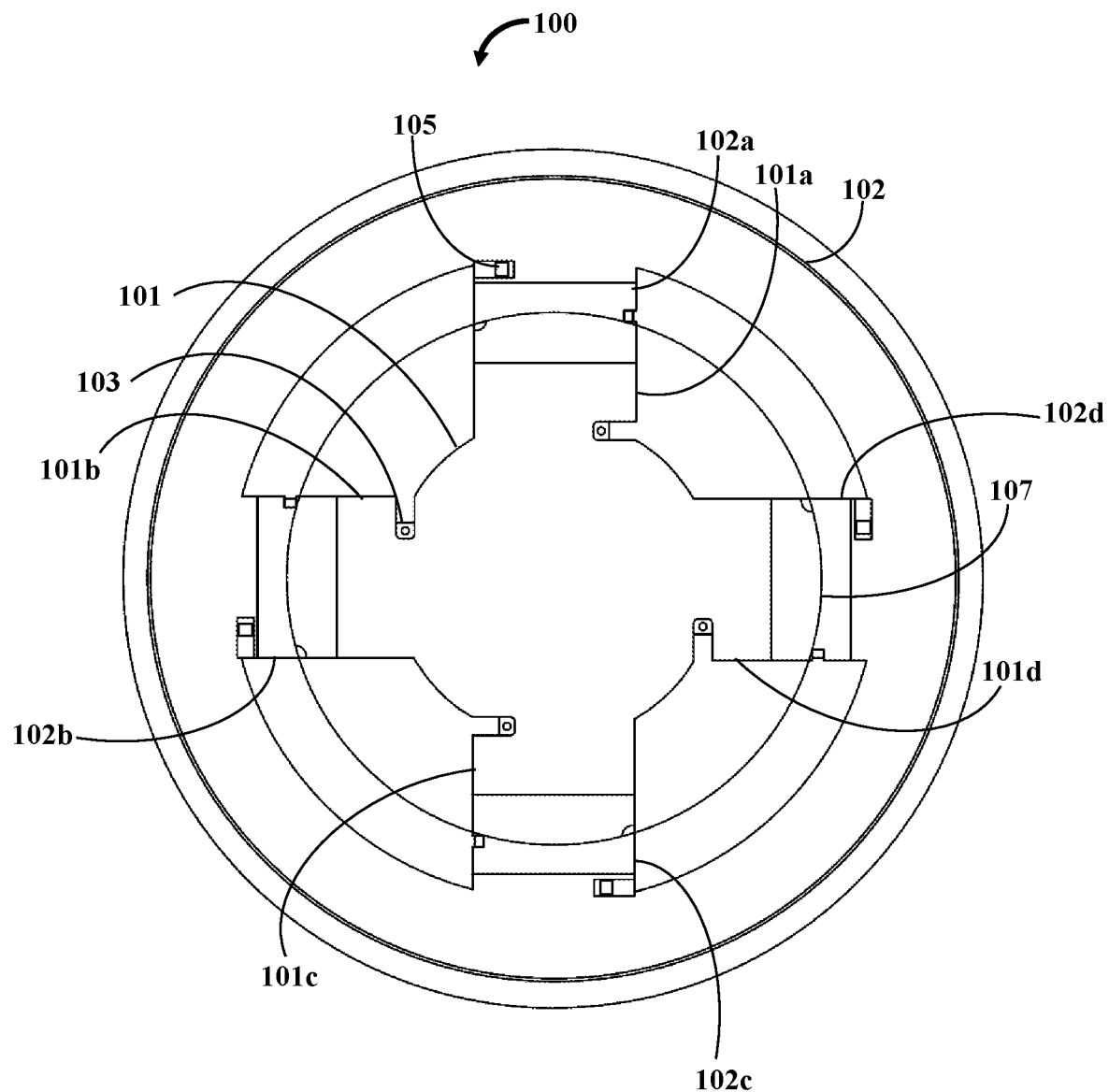
FIG. 1 exemplarily illustrates a cross sectional view of the electromechanical converter.

FIG. 1 exemplarily illustrates a cross sectional view of an electromechanical converter 100. The electromechanical converter 100 for automatically changing and adjusting driving torque from an engine of a vehicle comprises a set of windings, a rotor and its poles 101a, 101b, 101c, 101d, a stator and its poles 102a, 102b, 102c, 102d, relays, diodes, insulated gate bipolar transistors (IGBTs), capacitor, rotor shaft 109, stator shaft, auxiliary stator and its shaft and respective springs, control circuit and two batteries. The set of windings comprise first main winding 103, first subsidiary winding 104, first auxiliary windings 1081, 1082, 1083 (exemplarily illustrated in FIG. 6A), second main winding 105, second subsidiary winding 106, and second auxiliary windings 2081, 2082, 2083 (also exemplarily illustrated in FIG. 6B.) The rotor 101 is housed within a stator 102 and comprises one or more poles 101a. A hub of the stator shaft is configured to be engaged to an auxiliary stator to the output. The first main windings 103 and the first subsidiary windings 104 are wound on each pole 101a of the rotor 101 as exemplarily illustrated in FIG. 4. The stator 102 is coaxially positioned with the rotor 101. Moreover, the stator 102 is separated from the rotor 101 by an air gap 107. The air gap 107 includes hypothetical circle between rotor 101 and stator 102 illustrated in FIG. 1.

The auxiliary stator is engaged to the hub of the stator 102 shaft. The second main windings 105 and the second subsidiary windings 106 are wound on each pole 102a of the stator 102 as exemplarily illustrated in FIGS. 1 and 5. The batteries are configured to adsorption and desorption power to the set of windings of the rotor 101 and the stator 102. One of the main windings 103, 105 and subsidiary windings 104, 106 of each of the rotor 101 and the stator 102 are selectively switched-on to improve performance. Changing the time disconnect or connect the batteries increases the torque or decreases the torque in the stator shaft. The electromechanical converter 100 comprises two rotating coaxial cylindrical parts, which are the rotor 101 and the stator 102. The rotor 101 is inside the stator 102 similar to an electrical motor and thin air gap 107 exists between them. The inner surface of the stator 102 and the outer surface of the rotor 101 have a specific number of (and reversible design) parallel bumps with a specified width are extended parallel to the common axis of the rotor 101 and the stator 102 (or angle of it), which each is called a pole 101a and 102a. The poles 101a and 102a are wired in a certain manner.

In an embodiment, the rotor 101 and the stator 102 are made of thin sheets of iron coated with insulation (such as in electric motors) to reduce eddy currents and losses caused by it. Further, the beginning and the end of the rotor 101 and the stator 102 are connected to each other by separate bearings and each one has placed on separate bearings until they prevent shaking and their axes motion to one another, change the air gap 107, rub them together, and complete the magnetic fluxes path in place of the bearings. Further, each of the bearings of the rotor 101 and stator 102 connect the stator 102 and the rotor 101, the stator 102 and a chassis of the electromechanical converter 100, or the rotor 101 and the chassis of the electromechanical converter 100. The rotor 101 and the stator 102 have separate shafts, input-driving force is connected to the rotor shaft 109, and output-driving force is connected to the stator 102 shaft. Of course, in the basic design of the electromechanical converter 100, these can be interchanged.

At the same time, starting comparative rotation of the rotor 101 and the stator 102 induces a magnetic field by an effect of magnetic hysteresis in each of the poles 102a of the stator 102 when any pole 102a of the stator 102 approaches and leaves any special coil of the rotor 101. According to Lenz's law, an AC voltage is induced in the intended coil of the rotor 101 and by placing a diode with appropriate biasing in series with the coil; a direct current is drawn. This direct current creates the magnetic flux at the pole 101a of the rotor 101 coil, which is the same direction with the hysteresis magnetic flux of the pole 102a, and therefore opposing. Due to symmetry of the poles 101a and 102a, the winding of stator 102 and rotor 101 mentioned conditions to a rotor pole 101a is true in the case of all other poles of stator 102 and rotor 101 exactly.

When the rotor 101 starts rotation, the hysteresis magnetic field in the poles 101a of the rotor 101 cause current in coils of the stator 102 and mutually the stator 102 hysteresis magnetic field in the stator poles 102a cause opposing current in rotor 101 coils. The gradual increase in the current of coil of each pole 101a of the rotor 101 increases the magnetic field of pole 101a, and gradual increase in the magnetic field of pole 101a increases the current of coils of each pole 102a of the stator 102, and it increases the magnetic field of each pole 102a of the stator 102. Therefore, increasing the magnetic field increases the current and increasing the current increases the magnetic field.

In other words, creation and strengthening of the magnetic field in each of the poles 101a and 102a of the rotor 101 and stator 102 creates a positive feedback when rotation of the rotor 101 begins, and magnetic flux of rotor 101 and stator 102 poles 101a and 102a reaches its maximum value quickly. Of course, the air gap 107 existence between the rotor 101 and the stator 102 and at the bearing, which connects the rotor 101 and stator 102, prevents saturation of the rotor 101 and stator 102 cores. Despite the magnetic flux at the rotor poles 101a and stator poles 102a, the poles 101a and 102a can be considered as magnets that according to the same direction of the fluxes attract each other until fluxes have least reluctance in its path. Therefore, once the rotor 101 rotates the stator 102 desires to follow the direction of its rotation.

The amount of torque applied to the stator 102 depends on flux in all of the poles 101a 101b, 101c, 101d and 102a, 102b, 102c, 102d. The amount of the flux depends on the comparative angular velocity of the rotor 101 and the stator 102. If the rotor 101 speed were constant and greater than the stator 102, by reducing the stator 102 speed increases the comparative speed of the rotor 101 and stator 102, increases power, and as a result, increase the torque applied to the stator 102.

Conversely, by increasing the stator 102 speed reduce the comparative speed of the rotor 101 and stator 102 and as a result, the torque applied to the stator 102 is decreased. Therefore, the factor that changes the speed of the stator 102 is the resistant torque applied to it. Thus, by increasing or decreasing resistant torque applied to the stator 102, increase or decrease the torque that rotor 101 applies to it automatically. In the electromechanical converter 100, when the input torque and speed to the rotor 101 is constant, changing the resisting torque changes stator 102 speed and the applied torque to stator 102 automatically. While the conventional gearbox works at a particular gear, if the driving torque is more than the required torque, the vehicle speed does not exceed a certain value despite increasing fuel consumption.

The electromechanical converter 100 is adaptable for different modes of vehicle motion. In one example, the vehicle is moving forward with positive acceleration that is the speed of the vehicle increases. In this mode, the rotor 101 rotates faster than the stator 102 and main windings 103, 105 of rotor 101, stator 102 are connected, and subsidiary windings 104, 106 of rotor 101 and stator 102 are disconnected. In another example, when the vehicle moves forward with negative acceleration (braking mode), the rotor 101 rotates slower than the stator 102 and main windings 103, 105 of rotor 101 and stator 102 are disconnected and subsidiary windings 104, 106 of them are connected.

In case stronger and faster braking is required, the winding resistance must be at least and the current and torque be maximum until stator 102 speed, reaches up to rotor 101 speed (that is low speed or is stopped) in the shortest time possible. In case weaker and softer braking is required, for example, when vehicle is moving downhill, rotor 101 or stator 102 windings or both of them can be connected (series or parallel) to the vehicle battery until the earth's gravitational energy is used to charge the vehicle battery. If necessary, torque and acceleration can be increased by pressing a button and connecting windings of rotor 101 or stator 102 or both of them to the battery.

In another example, the vehicle is moving rearward with positive acceleration; that is the speed of the vehicle engine increases. In this mode, the rotor 101 rotates faster than the stator 102 in an anti-clockwise direction and main windings 103, 105 of rotor 101, stator 102 are disconnected, and subsidiary windings 104, 106 of rotor 101 and stator 102 are connected.

In another example, the vehicle is moving rearward with negative acceleration (braking mode). In this mode, the rotor 101 rotates slower than the stator 102 and they rotate anti-clockwise. The main windings 103, 105 of rotor 101 and stator 102 are connected and subsidiary windings 104, 106 of them are disconnected. The softer braking and faster braking modes are also applicable here as in the forward scenario explained earlier. In another example, the vehicle moves forward in neutral gear. In this mode, main and subsidiary windings 103,105, 104, 106 of rotor 101 and stator 102 are disconnected.

Moreover, depending on the vehicle speed, rotor 101 may rotate slower or faster than the stator 102. In another example, the vehicle moves rearward in neutral gear. In this mode, rotation of the rotor 101 and stator 102 is in reverse direction (anti-clockwise). The main and subsidiary windings 103, 105, 104, 106 of rotor 101 and stator 102 are disconnected. Further, depending on the vehicle speed, rotor 101 may rotate slower or faster than the stator 102. Finally, in the Half-clutch moving mode, the main and subsidiary windings 103, 105, 104, 106 of rotor 101 and stator 102 (or both of them in series or parallel) are connected to the vehicle battery by a suitable diode. In addition, the electromechanical converter 100 can create different percentages and continuous of half-clutch using chopper circuits.

The electromechanical converter 100 allows the possibility of recovery of additional energy in any mode of motion and prevents wasting it. Further, continuous changes of output torque automatically without the need to change gears manually is an added advantage provided by the electromechanical converter 100. Moreover, the electromechanical converter 100 prevents increasing fuel consumption and environmental pollution, depreciation of clutch, and other mechanical parts due to incorrect gear shifting. The electromechanical converter 100 also provides the possibility of vehicle motion in neutral gear and braking using the gearbox with low risk and does not apply additional torque to the vehicle.

One aspect of the present disclosure is an electromechanical converter for automatically changing and adjusting driving torque from an engine of a vehicle. This electromechanical converter comprises (a) a set of windings comprising first main windings, first subsidiary windings, first auxiliary windings, second main windings, second subsidiary windings, and second auxiliary windings; (b) a rotor housed within a stator, the rotor comprising one or more poles, wherein the first main windings and the first subsidiary windings are wound on each pole of the rotor, and wherein the first auxiliary windings are positioned between the poles; (c) the stator coaxially positioned with the rotor and the stator separated from the rotor by a gap, wherein the auxiliary stator is engaged to the hub of the shaft of the stator, wherein the second main windings and the second subsidiary windings are wound on each pole of the stator; and wherein the second auxiliary windings are positioned between the poles; and (d) a battery configured to power or absorb power from the set of windings of the rotor and the stator, wherein one of the main windings and subsidiary windings of each of the rotor and the stator are selectively switched-on to appropriate operation.

In one embodiment, the electromechanical converter further comprises a first method of winding, wherein a first end of each coil of main winding and subsidiary winding is positioned distally towards a wall of the poles of one of the rotor and the stator, and proximity to air gap, and a second end of each coil of main winding and subsidiary winding is distally exposed towards the other side wall of the poles of one of the rotor and the stator, and distant from the air gap. In a related embodiment, both sides of each of the main windings and the subsidiary windings are wound around a surface of each pole of the stator and the rotor with symmetrical angles.

In one embodiment, the electromechanical converter further comprises a second method of winding, wherein a first end of each coil of main winding and subsidiary winding is positioned distally towards a wall of the poles of one of the rotor and the stator, and a second end of each coil of main winding and subsidiary winding is distally exposed towards the other side wall of the poles of at least one of the rotor and the stator, and both end of them are near to air gap. In a related embodiment, both sides of each of coil of the main windings and the subsidiary windings are wound around a surface of each pole of the stator and the rotor, and proximity to air gap.

Figure 2A:
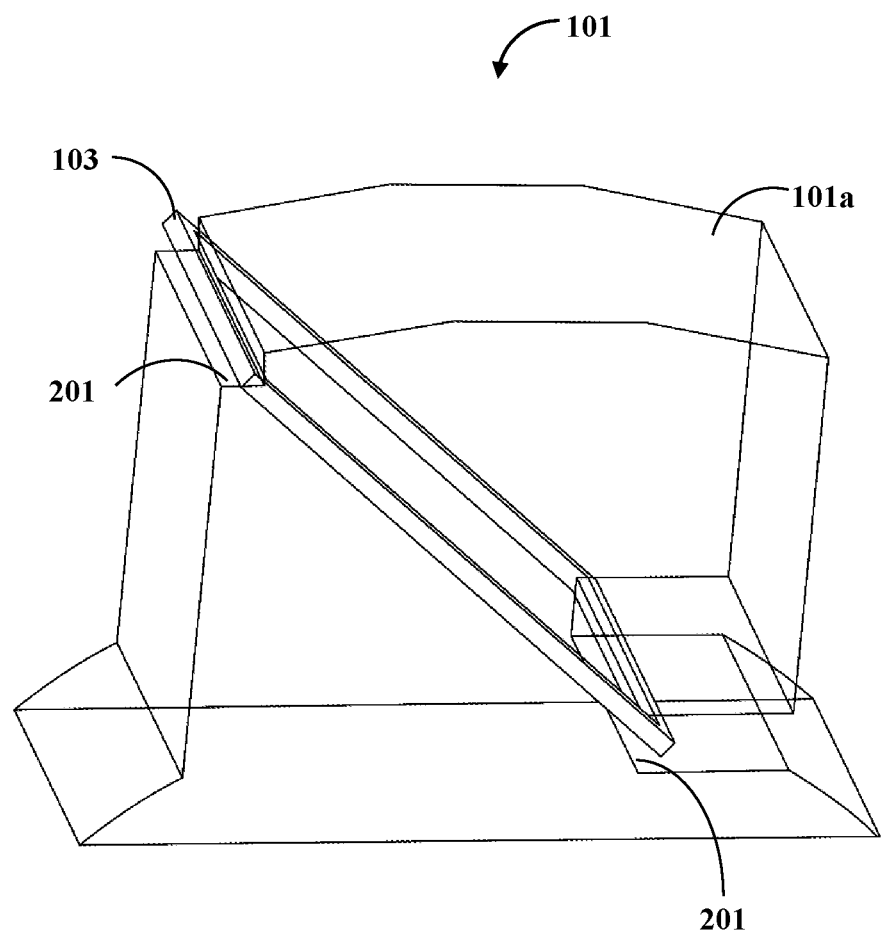
FIG. 2A exemplarily illustrates a top perspective view of a coil of the main winding of the rotor of the electromechanical converter.
Figure 2B:
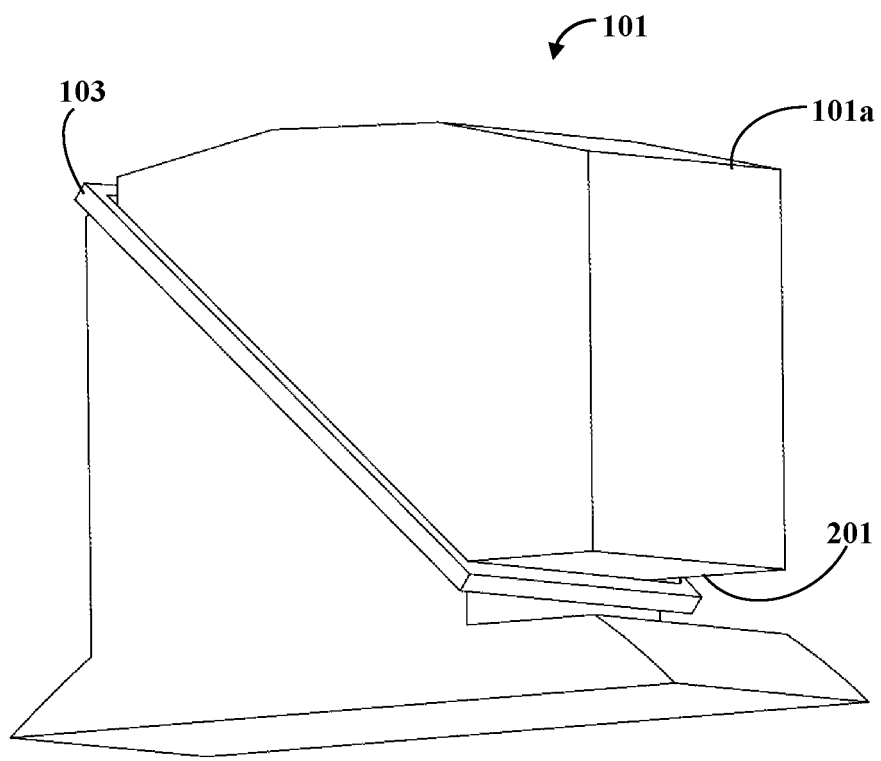
FIG. 2B exemplarily illustrates a bottom perspective view of a coil of the main winding of the rotor of the electromechanical converter.

FIG. 2A exemplarily illustrates a top perspective view of a coil of main winding 103 of a rotor 101 of an electromechanical converter 100. FIG. 2B exemplarily illustrates a bottom perspective view of a coil of main winding 103 of a rotor 101 of an electromechanical converter 100. One side of the coil of main winding 103 is placed on the pole 101*a* of the rotor 101 at the far left and wound on the pole 101*a* of the rotor 101 at the far right. Then the coil of main winding 103 goes to the opposite side of the pole 101*a* obliquely in-depth of the slot 201 between the poles 101*a* (or more away from the surface of the pole). The coil goes along the pole 101*a* through the slot 201 and close to pole wall symmetrically and completes the conductor loop around the pole 101*a*. Then all of coils of the winding connect together in series and is built the winding. This method of wire furling is called the first method.

In the second method of the wire furling, both sides of the coil place at the opposite sides of the pole 101*a* surface. Both of them are usable and practical but the operation of these methods is different slightly and each one has advantages and disadvantages compared with each other. One or more conductive rings that have put together are called a coil. The stator 102 main coils are placed together in series and the rotor 101 main coils are placed together in series too, and about the stator subsidiary coils, the stator auxiliary coils, the rotor subsidiary coils and the rotor auxiliary coils (separately).

Figure 3A:
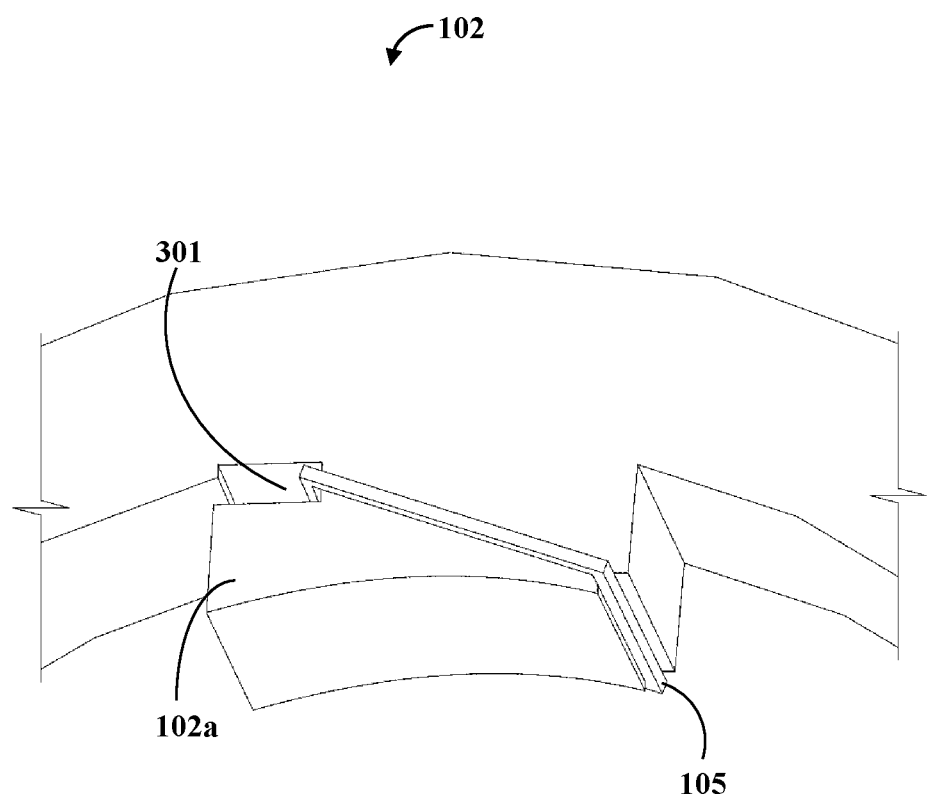
FIG. 3A exemplarily illustrates a bottom perspective view of a coil of the main winding of the stator of the electromechanical converter.
Figure 3B:
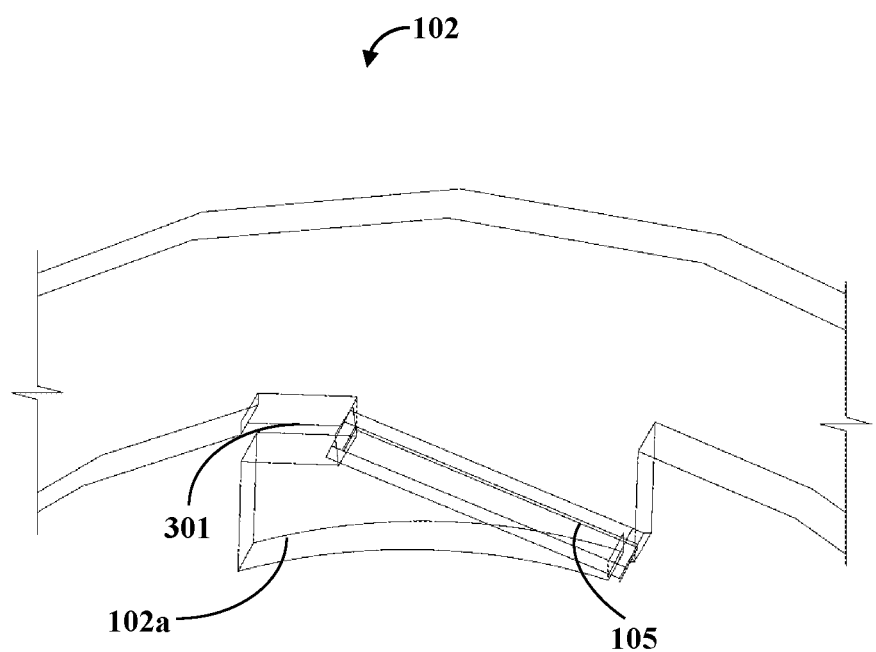
FIG. 3B exemplarily illustrates a bottom perspective view of a coil of the main winding of the stator of the electromechanical converter.

FIG. 3A exemplarily illustrates a bottom perspective view of a coil of main winding 105 of a stator 102 of an electromechanical converter 100. FIG. 3B exemplarily illustrates a bottom perspective view of a coil of main winding 105 of a stator 102 of an electromechanical converter 100.

Figure 4:
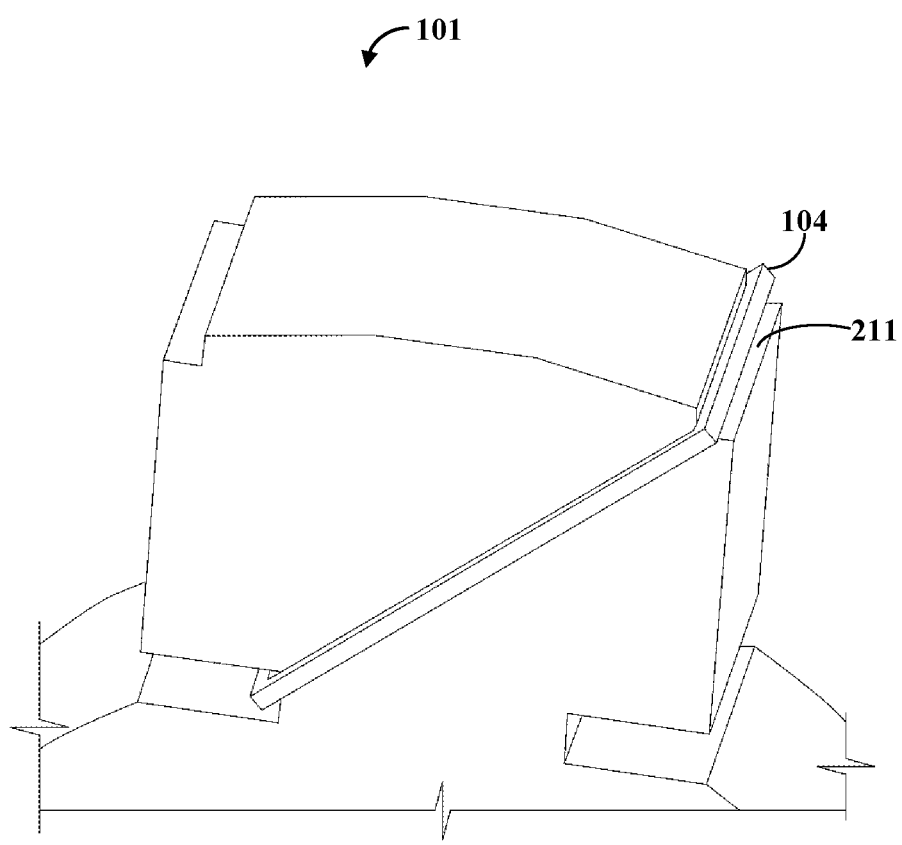
FIG. 4 exemplarily illustrates a top perspective view of a coil of the subsidiary winding of the rotor of the electromechanical converter.
Figure 5:
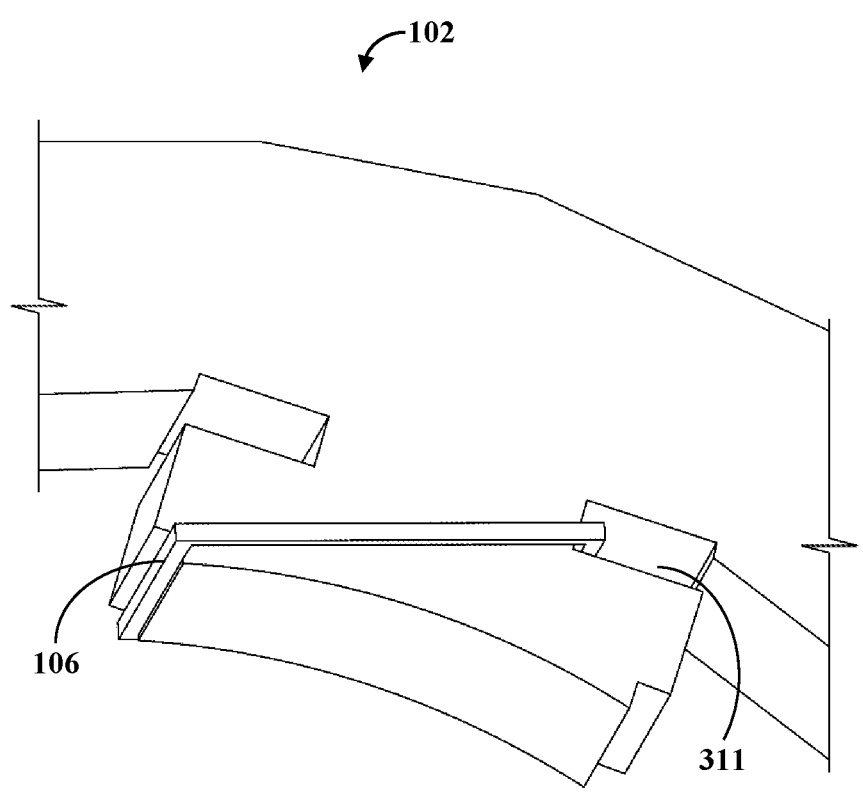
FIG. 5 exemplarily illustrates a bottom perspective view of a coil of the subsidiary winding of the stator of the electromechanical converter.

FIG. 4 exemplarily illustrates a top perspective view of a coil of subsidiary winding 104 of a rotor 101 of an electromechanical converter 100. The subsidiary winding 104 is seated in a slot 211 of the rotor 101 as shown. FIG. 5 exemplarily illustrates a bottom perspective view of a subsidiary winding 106 of a stator 102 of an electromechanical converter 100. The subsidiary windings 104 and 106 of rotor 101 and stator 102 are provided to create more capabilities in electromechanical converter 100. Thus, as exemplarily illustrated in FIGS. 2A and 3A, like any coil, for example, is furled at the right of each pole 101*a* and 102*a*, it is also repeated on the left of the pole 101*a* and 102*a* symmetrically, as subsidiary windings.

The subsidiary coil comes into use in cases when the comparative movement of direction of the rotor 101 and stator 102 is reversed, for example, when the vehicle is moving backwards or to reduce the speed by gearbox, moving forward, etc. In such cases, the main windings cannot work correctly; and the subsidiary windings 104 and 106 replace them. It does by direction finding sensor (shown in FIGS. 14 and 15) and relays that are connected in series with main and subsidiary windings of the rotor 101 and the stator 102, and they may connect main windings and disconnect subsidiary windings, or vice versa. Thus, in any operation mode, the main windings are connected and the subsidiary windings 104, 106 are disconnected or vice versa.

Figure 6A:
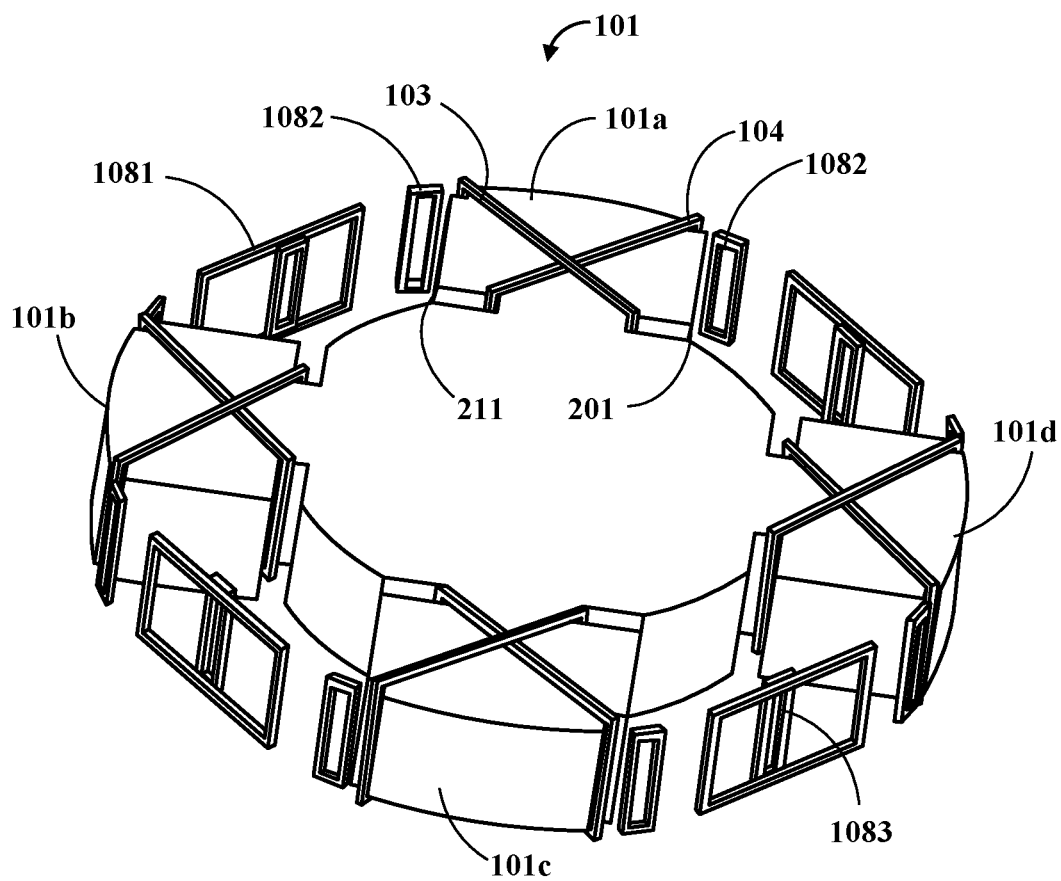
FIG. 6A exemplarily illustrates a perspective view of the rotor of the electromechanical converter showing an exemplary embodiment of all windings.

FIG. 6A exemplarily illustrates a perspective view of a rotor 101 of an electromechanical converter 100 showing all windings. Of course, each type coil of the auxiliary winding may be repeated between all of the poles. The rotor 101 of the electromechanical converter 100 comprises main winding coil 103 about each pole 101*a*. The main winding coil 103 and the subsidiary winding coil 104 of the rotor 101 are seated in slots 201 and 211 of the rotor 101. In an embodiment, auxiliary windings (1081, 1082 and 1083) are provided to improve the process of voltage creation and increase current gradually. The coils of auxiliary windings (1081, 1082 and 1083) are not furled around the poles 101*a* (unlike the main and subsidiary windings 103, 104).

One side of each main or subsidiary coil is at a special groove and close to the hypothetical cylindrical surface include air gaps between the rotor 101 and the stator 102 and other side of that is at another special groove. A groove is the distance between two adjacent poles like 101*a* and 101*b*. All windings should have least possible resistance to minimize heat generation in the electromechanical converter 100. For this purpose, windings made of copper, silver, gold, or combination thereof can be used. To create more capabilities, intended windings are connected to connection at the out of rotor 101 and stator 102, on the device chassis by conductor rings and rollers and is created various operation modes of the electromechanical converter 100.

Figure 6B:
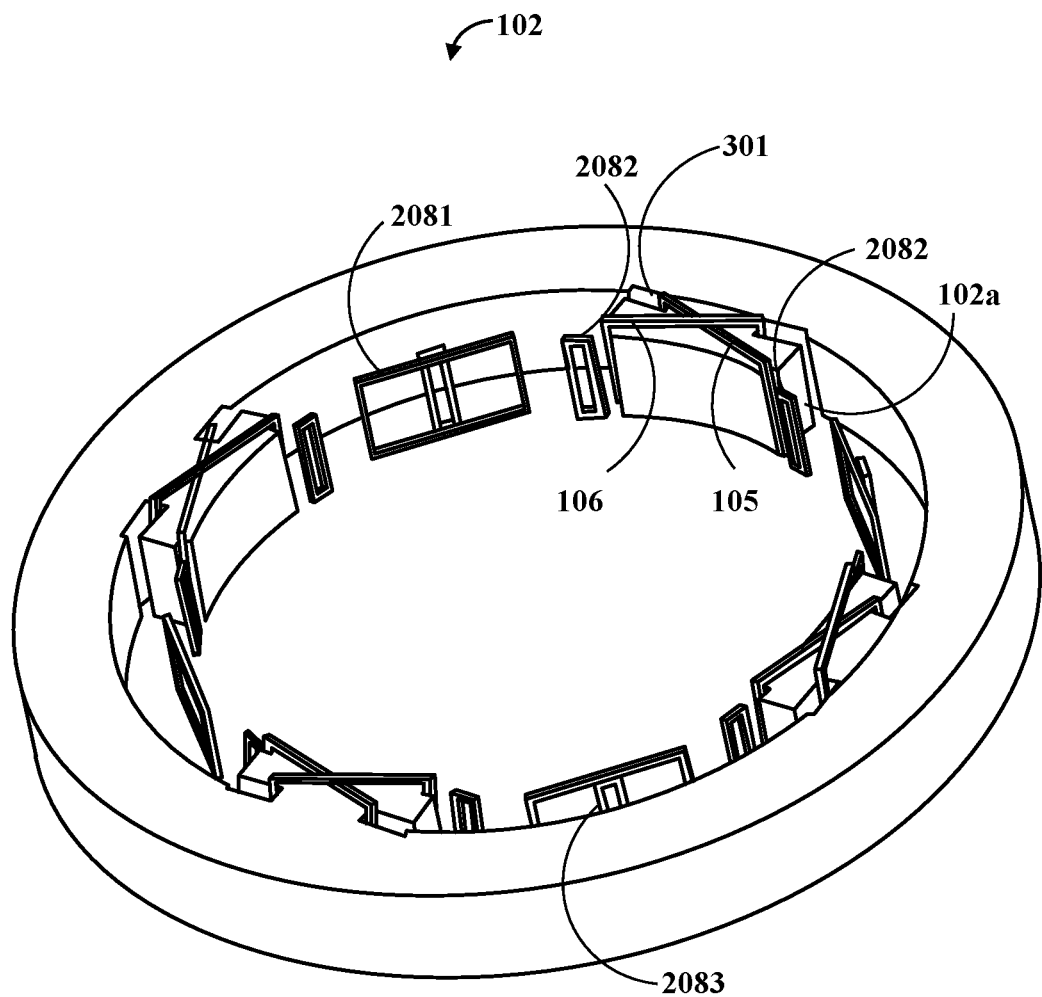
FIG. 6B exemplarily illustrates a perspective view of the stator of the electromechanical converter showing an exemplary embodiment of all windings.

FIG. 6B exemplarily illustrates a perspective view of a stator 102 of an electromechanical converter 100 showing all windings. Of course, each type coil of the auxiliary winding may be repeated between all of the poles. The stator 102 of the electromechanical converter 100 comprises main winding coils 105 about each pole 102*a*. The main windings 105 and the subsidiary windings 106 of the stator 102 are seated in slots 301 and 311 (shown in FIG. 5) of the stator 102. In an embodiment, auxiliary windings (2081, 2082 and 2083) are provided to improve the process of voltage creation and increase current gradually. The coils of auxiliary windings (2081, 2082 and 2083) are not furled around the poles 102*a* (unlike the main and subsidiary windings 105, 106).

Figure 7:
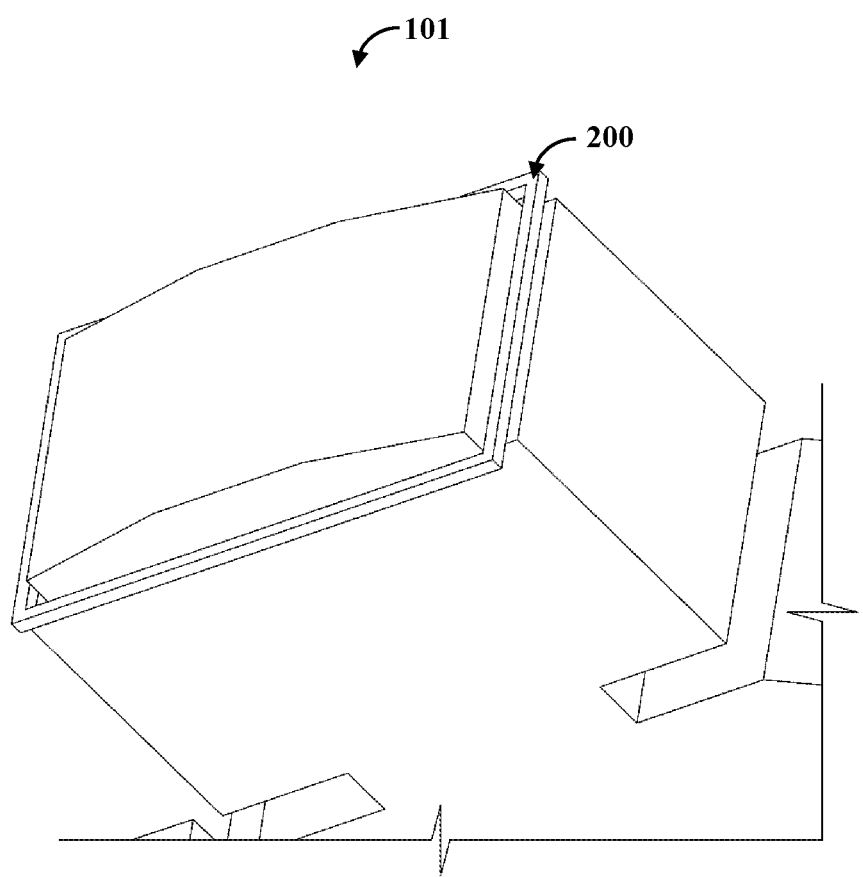
FIG. 7 exemplarily illustrates a perspective view of main and subsidiary coil of the rotor of the electromechanical converter showing the second method of winding.
Figure 8:
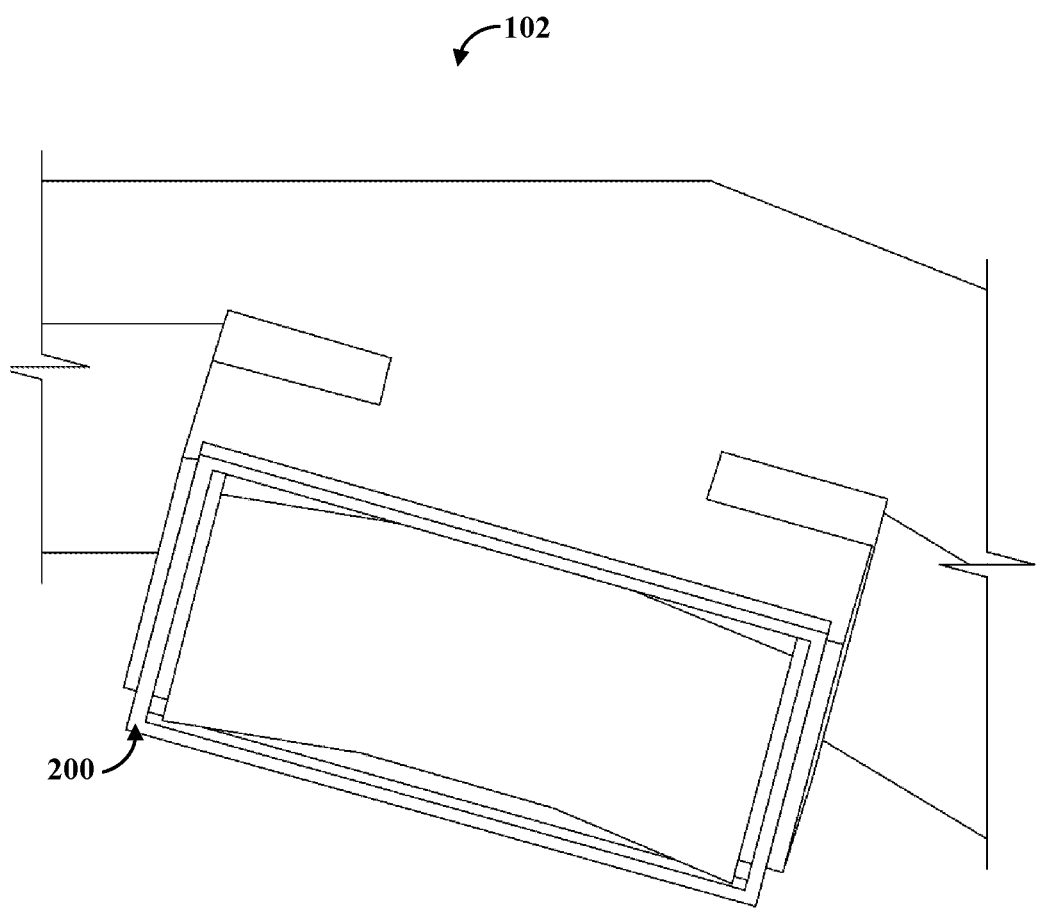
FIG. 8 exemplarily illustrates a perspective view of main and subsidiary coil of the stator of insulated gate bipolar transistor the electromechanical converter showing the second method of winding.

FIG. 7 exemplarily illustrates a perspective view of the rotor 101 of the electromechanical converter 100 (shown in FIG. 1) showing the second method of winding 200. FIG. 8 exemplarily illustrates a perspective view of the stator 102 of the electromechanical converter 100 showing the second method of winding 200.

Figure 9:
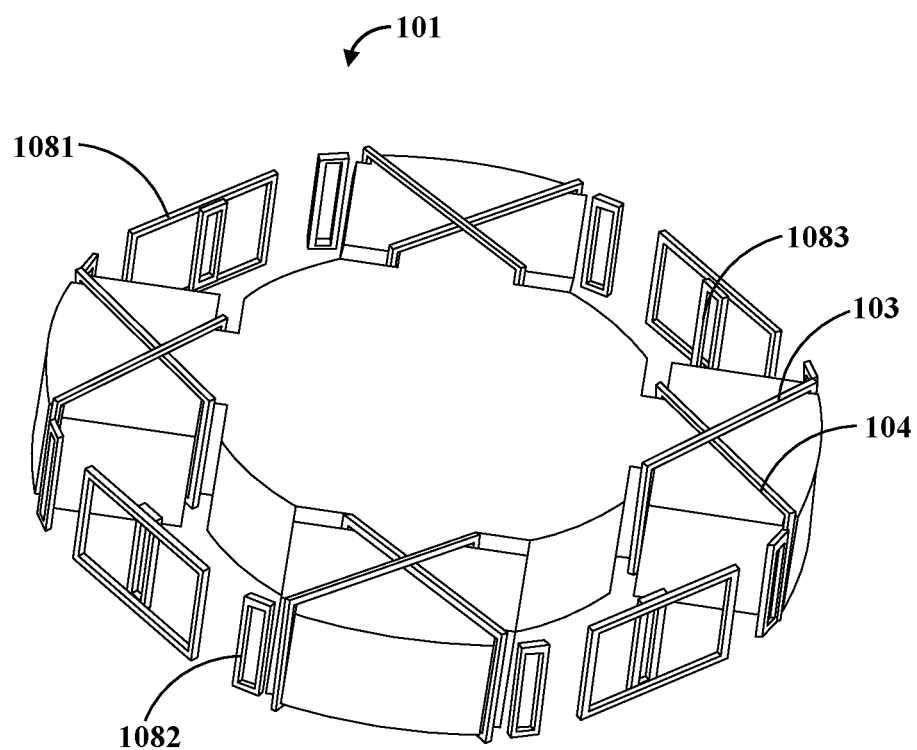
FIG. 9 exemplarily illustrates a perspective view of the rotor of the electromechanical converter showing all windings.
Figure 10:
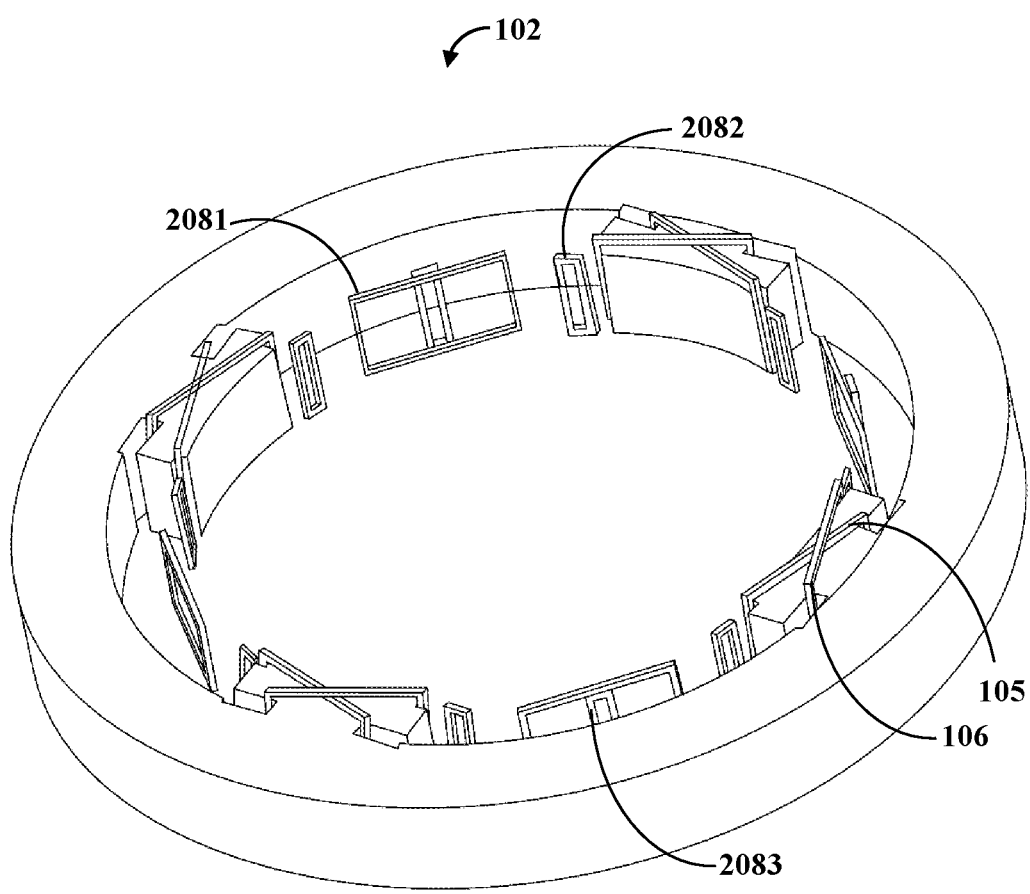
FIG. 10 exemplarily illustrates a perspective view of the stator of the electromechanical converter showing all windings.

FIG. 9 exemplarily illustrates a perspective view of the rotor 101 of the electromechanical converter 100 (shown in FIG. 1) showing all windings. The said winding comprises a first shape1 auxiliary winding 1081, a first shape2 auxiliary winding 1082 and a first shape3 auxiliary winding 1083, a first main winding 103 and a first subsidiary winding 104. The coils of different shapes of the auxiliary windings are illustrated in FIG. 9, respectively. FIG. 10 exemplarily illustrates a perspective view of the stator 102 of the electromechanical converter 100 showing all windings. The said winding comprises a second shape1 auxiliary winding 2081, a second shape2 auxiliary winding 2082, and a second shape3 auxiliary winding 2083, a second main winding 105 and a second subsidiary winding 106. The coils of different shapes of the auxiliary windings are illustrated in FIG. 10, respectively.

Figure 11:
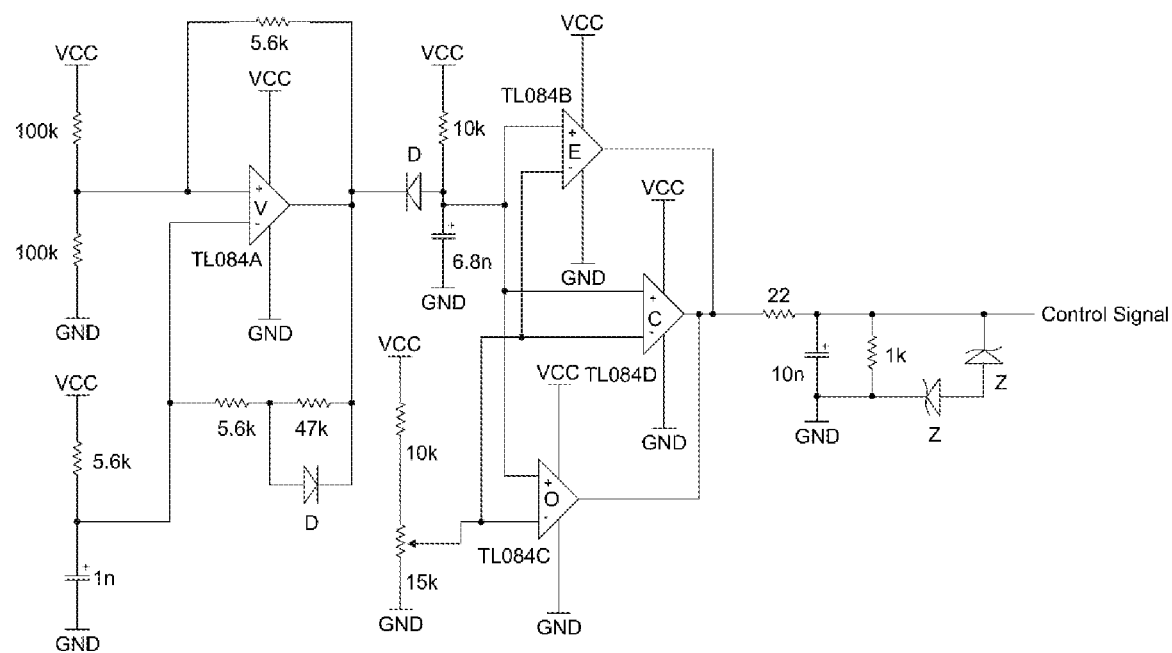
FIG. 11 exemplarily illustrates an IGBT driver circuit.

FIG. 11 exemplarily illustrates an insulated gate bipolar transistor (IGBT) driver circuit 1100. The IGBT driver circuit 1100 controls the IGBTs gate. Operational amplifier A is an oscillator that has a square output changed by a RC to ramp voltage. Then, the ramp voltage is compared to an adjustable DC voltage (supply voltage dividing by a potentiometer, manually) and creates square wave with adjustable pulse width which controls the turning on or off time of the IGBTs. In order to provide required IGBTs gate current, B, C, and D operational amplifiers are used synchronously. In an embodiment, any other similar driving circuit can be used instead of the IGBT driver circuit 1100. Of course changing pulse width can be by a potentiometer, manually, or by connecting to external circuits, intelligently.

Figure 12:
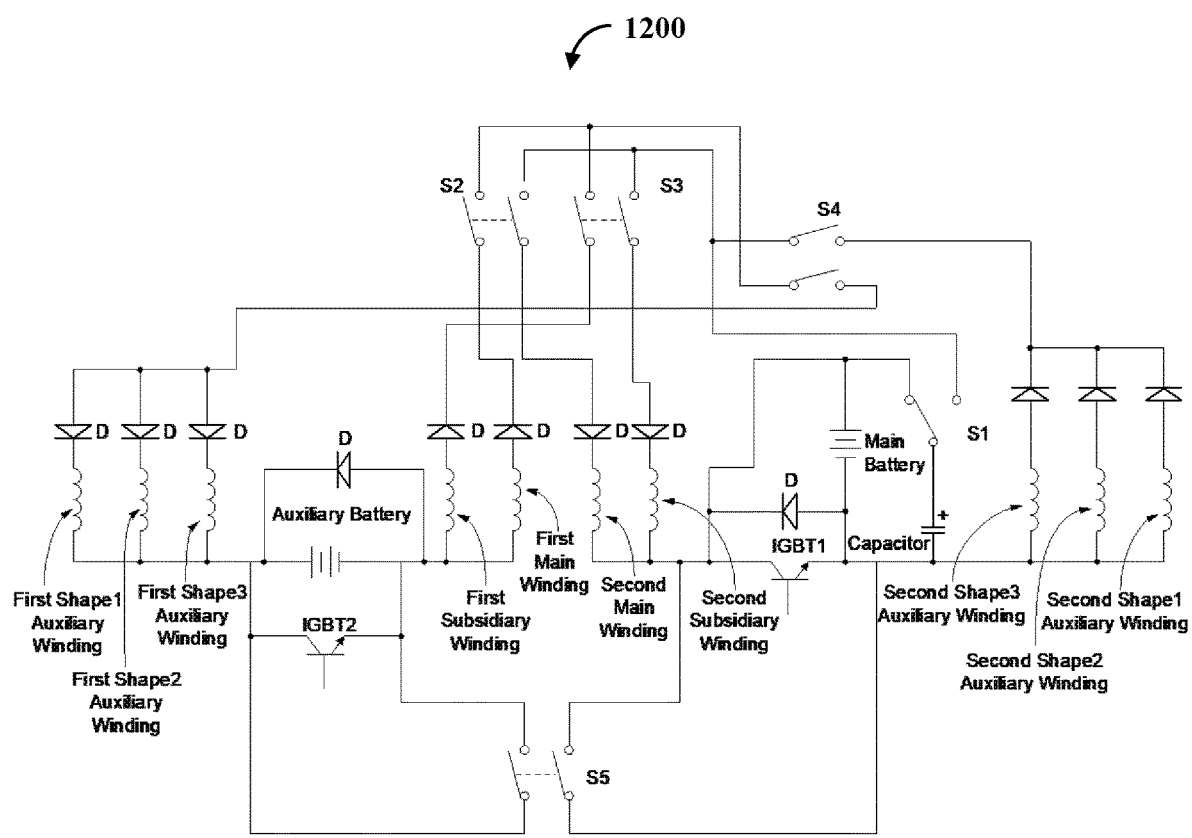
FIG. 12 exemplarily illustrates a circuit diagram showing batteries connected for different windings such as auxiliary, subsidiary and main windings implemented in the electromechanical converter.

FIG. 12 exemplarily illustrates a circuit diagram 1200 showing the batteries connected for different windings such as auxiliary, subsidiary and main windings implemented in the electromechanical converter 100. The connection or disconnection of the main and subsidiary windings is done by direction finding sensor and S2, S3 relays. In an embodiment, the connection of the capacitor to the main battery can charge the capacitor, recharge the capacitor in respective winding at starting time of comparative rotation of rotor and stator, and can recover hysteresis flux in the stator poles. It is done by using the direction finding sensor and S1, as exemplarily illustrated in FIG. 12, two end of each winding is connected to battery or is short circuit or open circuit. Power electronic circuit and chopper control the current in the windings.

As exemplarily illustrated in FIG. 12, the main and auxiliary batteries, each one is paralleled with a manageable semiconductor switch, for example, insulated gate bipolar transistor (IGBT) and one contact of the relay S5 and then is series with the rotor or stator windings. These two switches are turned on and off synchronously and with unique command by square pulses with frequency of 20 kHz (or more or less) consecutively. When be turned the switch on, short-circuit both ends of the winding and the battery is placed out of the circuit and when is turned it off, series the winding and battery. Switch controlling circuit changes the duration that the battery is in the circuit from zero to one hundred percent by changing the applied pulse width.

Thus, with zero pulse width, the battery is connected fully and circuit current is at minimum value. Gradual increasing of pulse width increases the current gradually and continuously because of the inductive nature of the windings. Both ends of the winding are connected at the one hundred percent pulse width (or close to it) and the current is at maximum value. By changing the current, applied torque to the stator and imposed resisting torque on the engine can be changed continuously until the engine speed optimizes and remains in the desired range. Moreover, the changing current can provide the different and continuous modes of half-clutch.

In order to be assured of the appropriate magnetic hysteresis existence in cores, a current pulse with low width (about 20 ms) and the appropriate value (about 50 A) is injected to main or subsidiary windings of stator. It is performed by a capacitor with proper capacitance value, which is charged earlier by the main battery (for example, car battery). At the time of beginning the comparative motion of the rotor and stator, direction finding sensor steers S1 relay and revives the magnetic hysteresis if weakened or its direction is inappropriate and starts the process of voltage creation.

As exemplarily illustrated in FIG. 12, auxiliary windings can be connected or disconnected by key S4. Usually this switch is closed and auxiliary windings are connected. S2 and S3 keys are N.C (normally close) and N.O (normally open) contacts of unit relay that is steered by direction finding sensor and in each moving mode two contacts of them are closed and other two are opened and connect main or subsidiary windings. IGBT1 and IGBT2 are switches, which change the time that the batteries are in series to the windings of the circuit manually or by other circuits automatically, and by getting square pulses with different widths, until the current, output torque, and the battery charging speed are changed. The S5 switch disconnects the battery completely manually.

Each of the auxiliary windings include a diode in series, is parallel with the respective main or subsidiary winding of the rotor or stator. Auxiliary windings are in three shapes that are shown in FIGS. 6A and 6B. Of course, in any design depending on the operating conditions, some of the auxiliary coils may be used and the others do not be used and in different models of the device may be some of the auxiliary coils exist and the others do not exist. In an embodiment, the windings are attached to cores (rotor or stator body) by stands of insulator and non-magnetic material. Coils of rotor main winding are series together as well as about rotor subsidiary winding, rotor auxiliary winding, stator main winding, stator subsidiary winding and stator auxiliary winding, individually.

Figure 13:
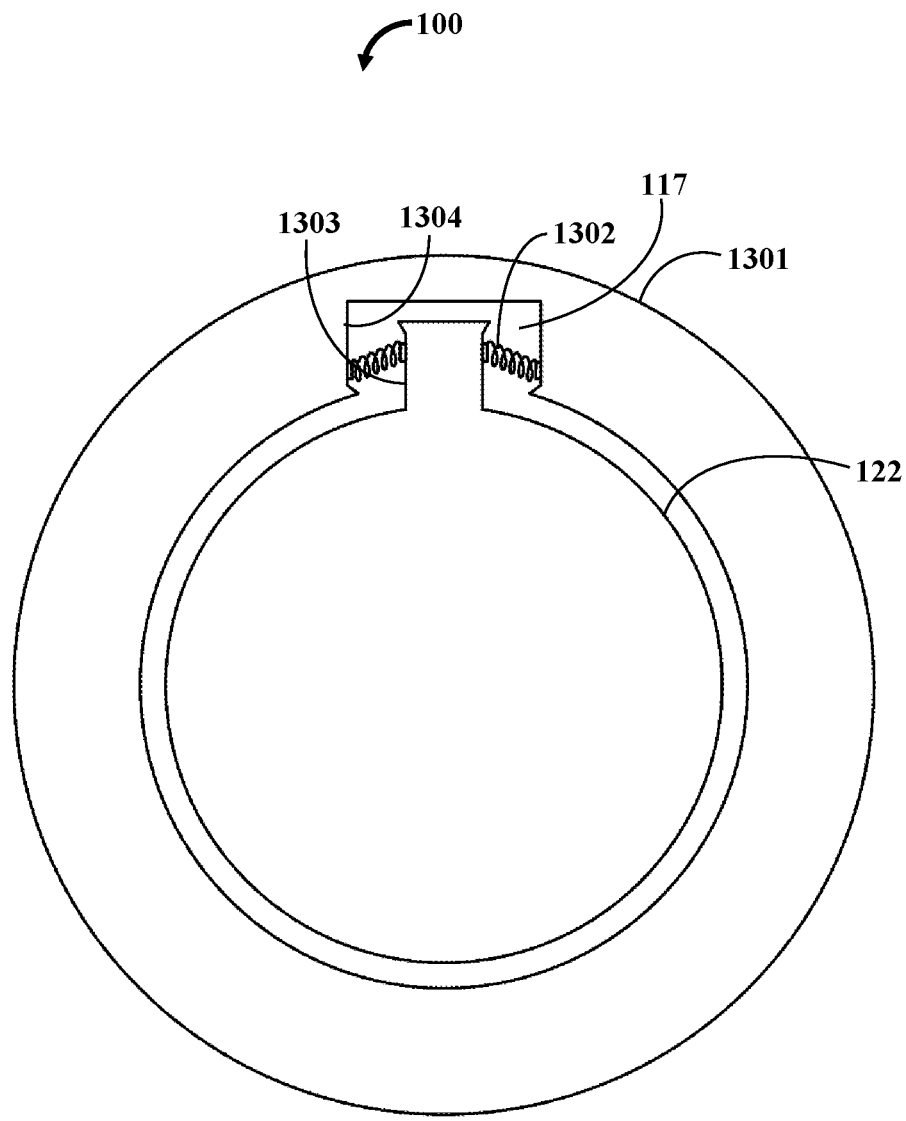
FIG. 13 exemplarily illustrates a cross section view of the stator shaft within the auxiliary stator of an electromechanical converter.

FIG. 13 exemplarily illustrates a front elevation view of stator shaft and auxiliary stator of an electromechanical converter 100. In an embodiment, the torque transmission from the stator shaft 122 to output section can use a supplement and connective part that call auxiliary stator 1301. The stator 102 is connected to the stator shaft 122 and the stator shaft 122 is engaged to auxiliary stator 1301 as shown in FIG. 13. Thus, the stator shaft 122 is placed inside a cylindrical shell, called auxiliary stator 1301. On the surface of the stator shaft 122 is created a papilla or projection 1303 with rectangular cross section and on the inner surface of the auxiliary stator 1301 is created a groove 1304 with rectangular cross section.

In an embodiment, the electromechanical converter 100 further comprises at least two spring elements 1302 positioned at a spacing 117 between the projection 1303 and groove 1304 to decrease fluctuations in torque output and shocks due to varying air gaps between the rotor 101 and stator 102. The two spring elements 1302 with large elastic modulus are placed at spacing 117 between the projection 1303 and groove 1304 walls vertically. The elastic modulus values of spring elements 1302 are equal and are proportional to the maximum value of applied driving torque.

Choosing the elastic modulus value of the spring elements 1302 have an important role in the functioning of this sector and being too small or large of them will be followed lack of proper functioning of this section. The electromechanical converter 100 can be used instead of conventional gearboxes in different cases. Of course, more effective using of the electromechanical converter 100 is when the mechanical energy be entered into it with lower torque and higher speed (within the speed limit of mechanical parts) and then be increased the output torque as much as necessary.

Figure 14:
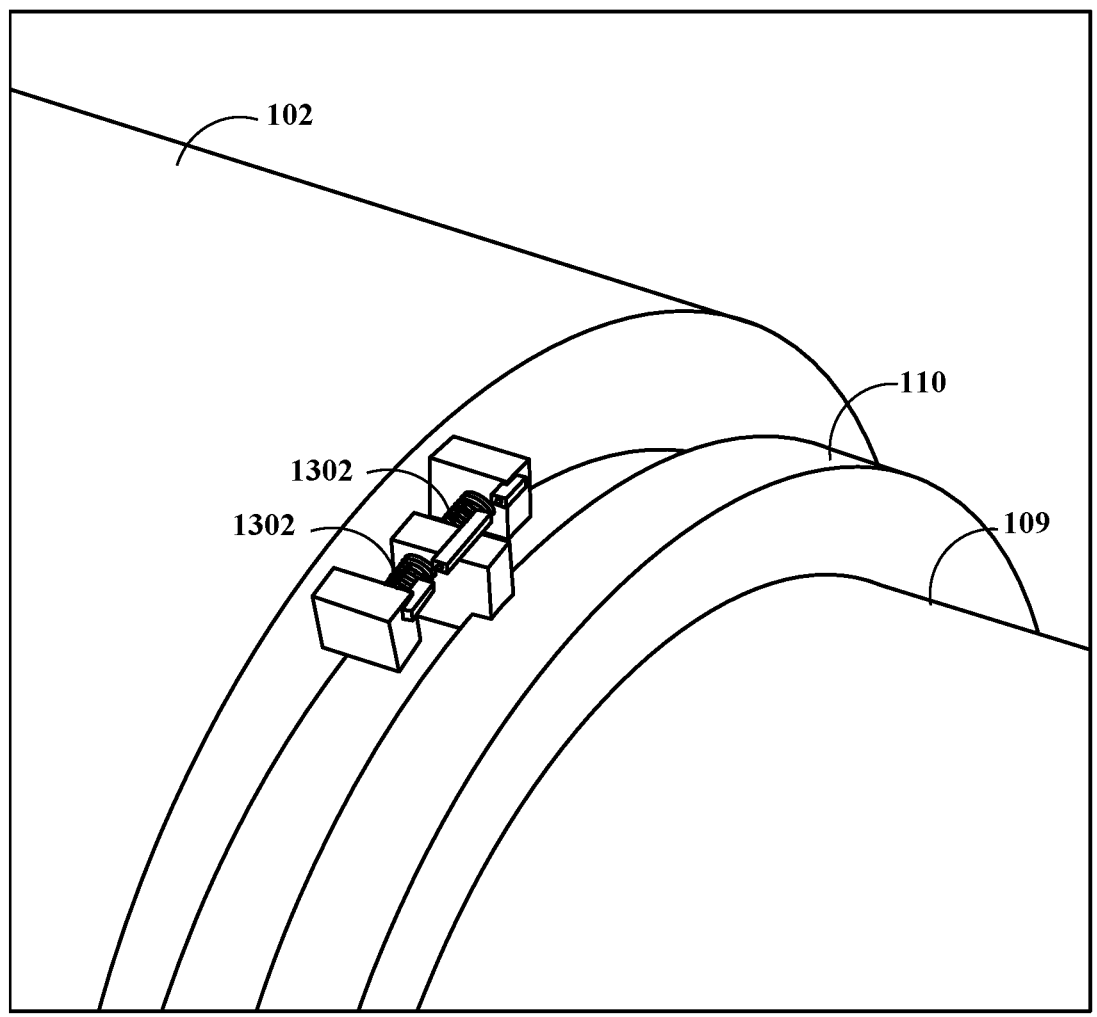
FIG. 14 exemplarily illustrates a perspective view of the direction finding sensor of an electromechanical converter.
Figure 15:
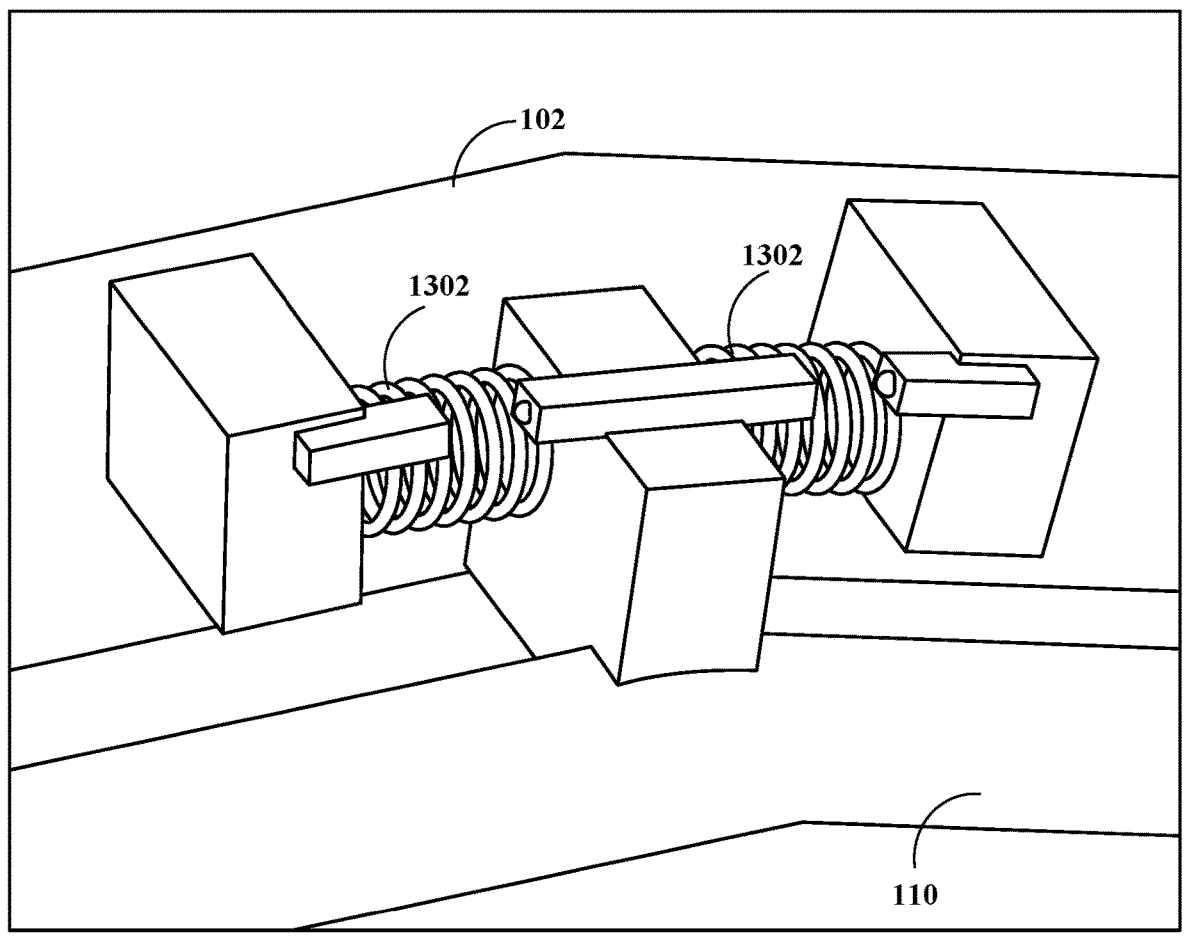
FIG. 15 exemplarily illustrates a zoom view of the direction finding sensor of an electromechanical converter.

In an embodiment, the direction finding sensor consisting of a thin and long brush 110 as long as circumference of the rotor shaft 109 with appropriate flexibility is pasted all around the rotor shaft 109 like strip and is fixed. It is attached on the rotor shaft 109 just tape and fixed and takes the form of a ring around it. Against this ring on the stator 102 is a projection, the direction finding sensor as shown in FIG. 14 and FIG. 15, which is connected to the stator 102 body by two weak linear spring elements 1302 that are connected on both sides of the projection. At the constant end of each spring element 1302 is located a micro switch. By moving and striking the projection/papilla into per side, the respective micro switch command is issued for target sectors of the circuit.

In one embodiment, the electromechanical converter further comprises at least two spring elements 1302 positioned at a spacing between a projection and groove of each stator shaft and auxiliary stator to decrease fluctuations in torque output and shocks due to varying air gaps between the rotor and the stator. In one embodiment, the rotor and stator are coated with an insulator to minimize eddy currents. In another embodiment, an auxiliary coil without pole is placed between the poles of the rotor or the stator to improve voltage generating and a gradual increase in current. In one embodiment, the rotor and stator are placed on separate bearings, and each of the bearings of the rotor and stator connect the stator and the rotor, the stator and a chassis of the electromechanical converter, or the rotor and the chassis of the electromechanical converter.

In one embodiment, the electromechanical converter further comprises a diode connected in series with each one of the auxiliary windings, main windings, and the subsidiary windings, wherein the diodes generate direct currents flow through the windings. In one embodiment, the electromechanical converter further comprises a direction-finding sensor positioned proximal to and in communication with the stator and rotor, wherein the direction-finding sensor is configured to detect the direction of rotation of the rotor and stator. In a related embodiment, the direction-finding sensor comprises a brush 110 fixedly attached along a circumference of the rotor shaft 109, wherein the brush 110 is configured as a flexible strip with varying width to contact a papilla connected to the stator body via linear springs, wherein a movement of the brush 110 strikes the papilla into each side micro switch located at constant ends of the linear springs to target sectors of the circuit.

In one embodiment, the electromechanical converter 100 further comprises a set of relays in series with the main windings and the subsidiary windings of the rotor and stator, wherein the relays are configured to selectively connect and disconnect the main windings and the subsidiary windings. In one embodiment, the windings are made of one of silver, copper, and gold to minimize the resistance and resultant heat generated. In a related embodiment, an external button is in communication with the relays, wherein the external button connects the main windings or the subsidiary windings to the battery for increasing the torque and acceleration generated relatively between the stator and the rotor. In one embodiment, the rotor rotates faster than the stator while the main windings of the rotor and the stator are connected, wherein the subsidiary windings are disconnected in a forward movement causing a positive acceleration of the engine. In another embodiment, the rotor rotates slower than the stator while the main windings of the rotor and the stator are disconnected, wherein the subsidiary windings are connected for the forward movement of the vehicle with negative acceleration of the engine. In a related embodiment, the negative acceleration of the engine is one of a fast braking mode and a soft braking mode.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions.

Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. An electromechanical converter for automatically changing and adjusting driving torque from an engine of a vehicle, comprising;
   a set of windings comprising first main windings, first subsidiary windings, first auxiliary windings, second main windings, second subsidiary windings, and second auxiliary windings;
   a rotor housed within a stator, the rotor comprising one or more poles, wherein the first main windings and the first subsidiary windings are wound on each pole of the rotor, and wherein the first auxiliary windings are positioned between the poles;
   the stator coaxially positioned with the rotor and the stator separated from the rotor by a gap, the stator comprising one or more poles, wherein the second main windings and the second subsidiary windings are wound on each pole of the stator; and wherein the second auxiliary windings are positioned between the poles;
   at least two batteries configured to power or absorb power from the set of windings of the rotor and the stator, wherein one of the main windings and subsidiary windings of each of the rotor and the stator are selectively switched-on to appropriate operation, and
   an output shaft is connected to an auxiliary stator, and the auxiliary stator is engaged to the hub of a stator shaft, further comprising at least two spring elements positioned at a spacing between a stator shaft projection and an auxiliary stator groove to decrease fluctuations in torque output and shocks due to varying air gaps between the rotor and the stator.

2. The electromechanical converter of claim 1, further comprising a first method of winding, wherein a first end of each coil of first and second main winding and first and second subsidiary winding is positioned distally towards a wall of the poles of one of the rotor and the stator and proximity to air gap, and a second end of each coil of first and second main winding and first and second subsidiary winding is distally exposed towards other side wall of the poles of one of the rotor and the stator and distant from the air gap.

3. The electromechanical converter of claim 2, wherein each coil of the main windings and the subsidiary windings are wound obliquely around a surface of each pole of the stator and the rotor.

4. The electromechanical converter of claim 1, further comprising a second method of winding, wherein a first end of each main winding and subsidiary winding is positioned distally towards the right wall of the poles of one of the rotor and the stator, and a second end of each main winding and subsidiary winding is distally exposed towards the left wall of the poles of one of the rotor and the stator.

5. The electromechanical converter of claim 4, wherein both sides of each coil of the main windings and the subsidiary windings are wound around a surface of each pole of the stator and the rotor.

6. The electromechanical converter of claim 1, wherein the rotor and stator are coated with an insulator to minimize eddy currents.

7. The electromechanical converter of claim 1, wherein an auxiliary coil without pole is placed between the poles of the rotor and the stator to generate voltage and a gradual increase in current.

8. The electromechanical converter of claim 1, wherein the rotor and stator are placed on separate bearings, and each of the bearings of the rotor and stator connect the stator and the rotor, the stator and a chassis of the electromechanical converter, or the rotor and the chassis of the electromechanical converter.

9. The electromechanical converter of claim 1, further comprising one or more diodes connected in series with each of the auxiliary windings, the main windings and the subsidiary windings of the rotor and the stator, wherein the diode generates a direct current flow through the windings.

10. The electromechanical converter of claim 1, further comprising a direction-finding sensor positioned proximal to and in communication with the stator and rotor, wherein the direction-finding sensor is configured to detect the direction of comparative rotation of the rotor and stator.

11. The electromechanical converter of claim 10, wherein the direction-finding sensor comprises a brush fixedly attached along a circumference of a rotor shaft, wherein the brush is configured as a flexible strip with varying width to contact a papilla connected to the stator body via linear springs, wherein a movement of the brush strikes the papilla into a side micro switch located at constant ends of the linear springs to target sectors of the circuit.

12. The electromechanical converter of claim 1, further comprising a set of relays in series with the auxiliary windings, the main windings and the subsidiary windings of the rotor and stator, wherein the set of relays are configured to selectively connect and disconnect each of the auxiliary windings, the main windings and the subsidiary windings to circuit, separately.

13. The electromechanical converter of claim 1, the set of windings comprising first main windings, first subsidiary windings, first auxiliary windings, second main windings, second subsidiary windings, and second auxiliary windings, are made of one of silver, copper, gold or its combination thereof, to minimize the resistance and resultant heat generated.

14. The electromechanical converter of claim 1, wherein an external button is in communication with the set of relays, wherein the external button connects both the main windings or the subsidiary windings to the battery for increasing the torque and acceleration generated relatively between the stator and the rotor.

15. The electromechanical converter of claim 1, wherein the main windings of the rotor and the stator are connected, wherein the subsidiary windings are disconnected while the rotor rotates faster than the stator in a forward movement, causing a positive acceleration of the engine, or rotor rotates slower than the stator in a backward movement causing a negative acceleration of the engine.

16. The electromechanical converter of claim 15, wherein the negative acceleration of the engine is one of a fast braking mode and a soft braking mode.

17. The electromechanical converter of claim 1, wherein the main windings of the rotor and the stator are disconnected, wherein the subsidiary windings are connected while the rotor rotates slower than the stator for the forward movement of the vehicle with negative acceleration of the engine, or rotor rotates faster than the stator in a backward movement causing a positive acceleration of the engine.

18. The electromechanical converter of claim 17, wherein the negative acceleration of the engine is one of a fast braking mode and a soft braking mode.

* * * * *